Nov. 15, 1966  J. E. LANG ETAL  3,285,826
FUEL ELEMENT CONTAINING A MECHANICALLY COMPRESSIBLE MANDRIL
Filed May 20, 1966  3 Sheets-Sheet 1
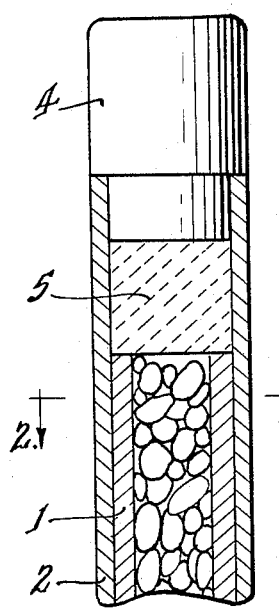
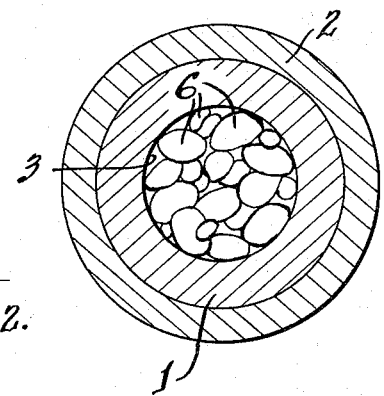
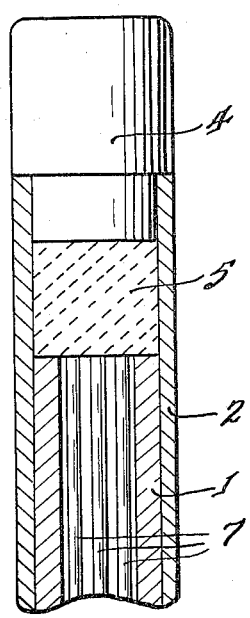
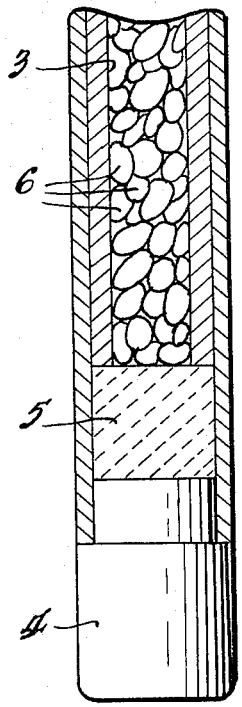
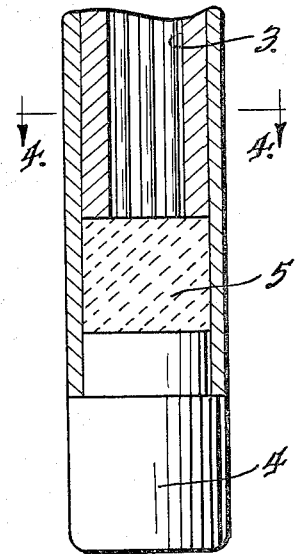
Inventors
James E. Lang
Richard A. Proebstle
Leonard G. Wisnyi
Attorney Nov. 15, 1966  J. E. LANG ETAL  3,285,826
FUEL ELEMENT CONTAINING A MECHANICALLY COMPRESSIBLE MANDRIL
Filed May 20, 1966  3 Sheets—Sheet 2
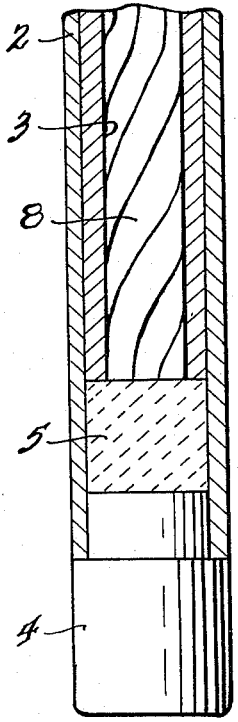
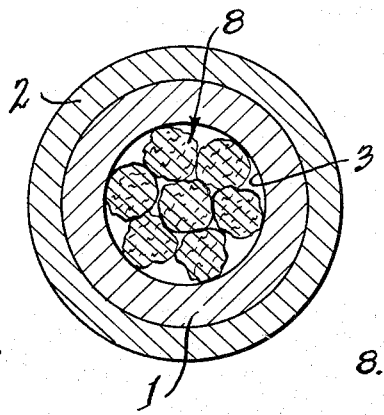
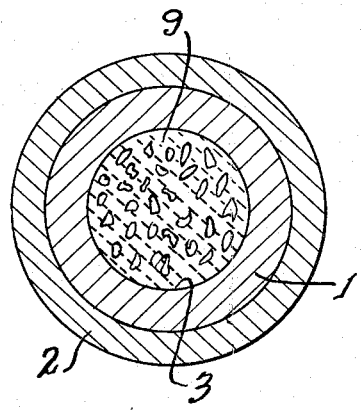
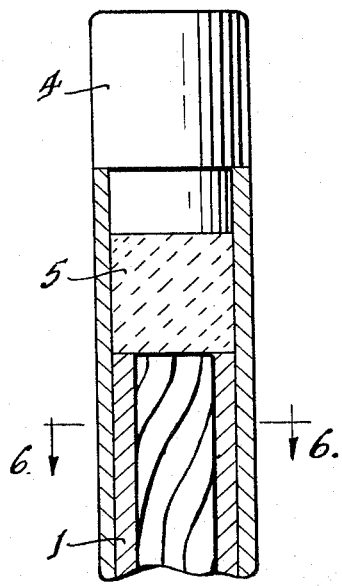
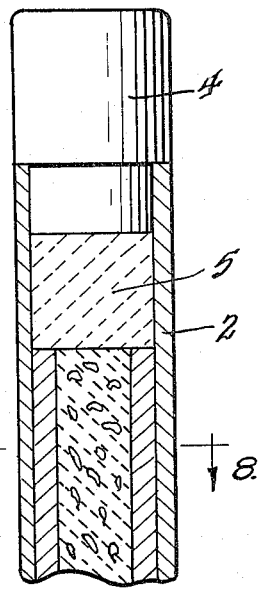
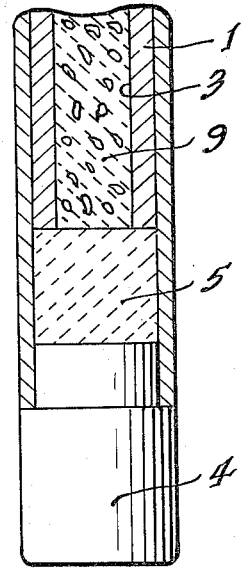
Inventors
James E. Lang
Richard A. Proebstle
Leonard G. Wisnyi
Attorney

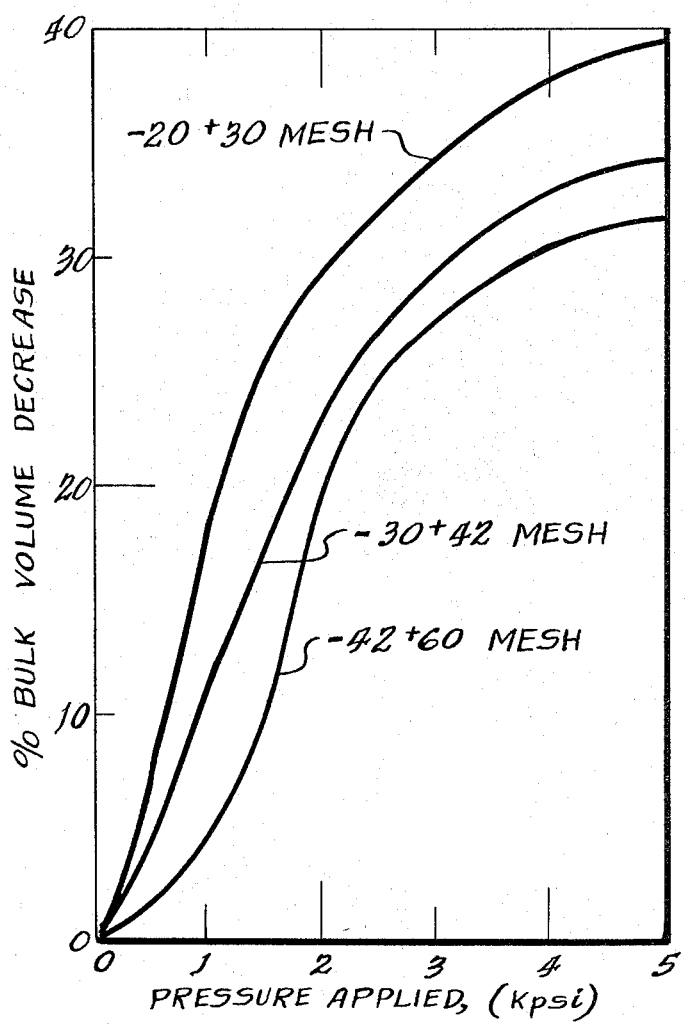

United States Patent Office 3,285,826
Patented Nov. 15, 1966

3,285,826
FUEL ELEMENT CONTAINING A MECHANICALLY COMPRESSIBLE MANDRIL
James E. Lang, Schenectady, Richard A. Proebstle, Scotia, and Leonard G. Wisnyi, Schenectady, N.Y., assignors to the United States of America as represented by the United States Atomic Energy Commission
Filed May 20, 1966, Ser. No. 551,786
6 Claims. (Cl. 176—68)

The invention described herein was made in the course of, or under, a contract with the United States Atomic Energy Commission.

This invention relates to a fuel element for a nuclear reactor. In more detail, the invention relates to a tubular ceramic fuel element incorporating a refractory mandril or plug at the center thereof.

It is well known that peak temperatures in excess of the melting point of ceramic fuel can be easily reached at the center of fuel elements for high-temperature, high-power-density power reactor fuel elements and that operation of fuel elements under these conditions is not good practice under the present state of the art. To avoid such difficulties, it has been suggested that the fuel should be placed in an annulus surrounding a central opening. Simply leaving the center void in such an element is, however, not safe due to the possibility of cracking and spalling of the fuel, with dislocated fragments falling into the bottom of the central void. Such relocation could cause undesirable changes in localized nuclear reactivity as well as cause increases in heat flux which might cause failure of the element. Patent No. 2,864,758 suggests that this danger can be avoided by employing a ceramic tubular mandril at the center of the fuel element to hold in place the fuel material. According to this patent, the fuel is uranium dioxide formed by in situ oxidation. The mandrils used as described in this patent are of a low-density, solid, ceramic material of high strength such that, if the highly enriched fuel was either too tightly packed or was burned to significantly in excess of 50% of the contained $U^{235}$ atoms, the cladding would yield and be plastically strained or would rupture. Since it is well known that uranium oxide fuel undergoes incompressible swelling of the order of 0.7% $\Delta$ v.v. per $10^{20}$ fissions per cm.$^3$ during fuel depletion, the use of an incompressible mandril will cause cladding failure at high fission depletion.

It is accordingly an object of the present invention to develop a fuel element incorporating a ceramic annular core and a compressible mandril which is compatible with the fuel material, which will yield to swelling of the fuel and which will also withstand the high-temperature environment at the center of a ceramic fuel system.

It is a more specific object of the present invention to develop such a mandril for a uranium dioxide fuel element.

In order to satisfy the objects of this invention, it is apparent that the mandril material or structure must have a crushing or deforming strength significantly lower than the yield strength of the cladding material. Likewise, the mandril must be compressible to such an extent as to accommodate the volume increase of the fuel surrounding it as the operation of the fuel element proceeds. As will become apparent, the present invention comprehends a number of different embodiments of the invention, incorporating several different structures which may be formed of a large number of different refractory materials. The invention is preferably practiced by employing hollow spheres or bubbles of calcia-stabilized zirconia as a compressible mandril filling the central opening in the annular ceramic fuel element. Low-density, sinterable rods of the same material may also be employed as may ceramic fibers. Likewise, a low-density ceramic foam may be employed. In each case the mandril has sufficient integrity to prevent fragments of fuel from falling into the central void while being sufficiently compressive to yield to inward swelling of the fuel element.

Materials other than calcia-stabilized zirconia can also be used to form the mandril. For example, other ceramic refractory materials such as beryllia, alumina, fused silica, yttrium oxide, cerium oxide and lanthanum oxide can also be used. Likewise, refractory metals such as tungsten, molybdenum, tantalum, and niobium can also be used in preparing the mandril.

The invention will next be described in connection with the accompanying drawing wherein:

FIG. 1 is a vertical view of a fuel element, partly in section, disclosing one embodiment of the present invention.

FIG. 2 is a horizontal sectional view taken in the direction of the arrows 2—2 in FIG. 1.

FIG. 3 is a vertical view, partly in section, of a second embodiment.

FIG. 4 is a horizontal sectional view thereof.

FIG. 5 is a vertical view, partly in section, of a third embodiment.

FIG. 6 is a horizontal sectional view thereof.

FIG. 7 is a vertical view, partly in section, of an alternative form of the present invention.

FIG. 8 is a horizontal sectional view thereof.

FIG. 9 is a graph showing the behavior of zirconia spheres when subjected to pressure.

As shown in FIG. 1, the fuel element comprises an annular core 1 consisting of a fissionable ceramic material such as $U^{235}O_2$ which is contained in cladding 2 and encloses a central opening 3. Caps 4 separated from the fuel by heat barrier rings 5 are provided at either end of the fuel element. Central opening 3 is filled with a plurality of hollow bubbles or spheres 6 of different sizes formed of a ceramic material which may be and preferably is cubic phase zirconia stabilized with 5–10 wt. percent calcia. Spheres 6 range from 5 mils to 100 mils in diameter, have bulk densities ranging from 15% to 50% of theoretical and consist of an arc fused, dense shell surrounding a central void. These bubbles or spheres can accommodate large amounts of fuel swelling (greater than 25% of initial mandril volume), have excellent water corrosion resistance, and are usable to the melting temperature of zirconia (2500° C.). This mandril will retain in place cracked and spalled pieces of the annular fuel pellets yet will crush under low stresses (less than 1000 p.s.i.) when the fuel swells inwardly, thus preventing rupture of the cladding. These hollow spheres can be obtained commercially and are prepared by forcing melted zirconia through a very small orifice and blowing air through the stream. The resulting spheres are then classified into hollow spheres and solid spheres.

In the embodiment shown in FIGS. 3 and 4, the mandril comprises a plurality of rods 7 which are composed of a low-density, sinterable material—for example, zirconia. The low-density extruded rods may be fabricated from —325 mesh Zircoa hafnium-free $ZrO_2$ stabilized with 5 wt. percent CaO. Methocel-water solution is used as a plasticizer and binder, and the plastic mass is extruded through a 0.160″ diameter die. The extruded rods are slowly dried to minimize warping, and are sintered in air at temperatures from 1200° C. (2192° F.) to 1800° C. (3272° F.) to bulk densities of 58 to 76% of theoretical. While a plurality of rods is shown, it is also contemplated that a single rod might be used—particularly if the opening 3 is of a small diameter. The remaining elements shown in these figures are identical to those of the embodiment of FIGS. 1 and 2 and accordingly are given the same numbers. Such a mandril can be employed when the central temperature of the fuel element is not expected to exceed the sintering temperature of the material from which the mandril is formed and the mandril will not be exposed to superheated water. Such a mandril design does provide for a small amount of mandril shrinkage for accommodation of fuel swelling.

In the embodiment shown in FIGS. 5 and 6, the mandrel comprises a rope 8 woven from vbers of a ceramic material, such as zirconia. Fibers may be of any suitable thickness such as $3\mu$. The fibers are also formed by extruding liquid zirconia through a very small opening. Fibers prepared in this way have the appearance of cotton and thus can be easily woven into a rope. Such a construction is quite suitable from the standpoint of accommodation of swelling but cannot be used where the temperatures reached are above about 1200° C. The physical characteristics of the rope may be improved by weaving metal strands into the rope along with the ceramic fibers.

In the embodiment shown in FIGS. 7 and 8, the mandril consists of a mass of ceramic foam 9—for example, 22–44% density zirconia. The foam is prepared by mixing a burnable material such as sawdust with the zirconia and burning out the sawdust before sintering the foam.

Certain tests which we have performed to show suitability of the various mandril materials disclosed will next be described.

I. Thermal stability tests

A. CaO-stabilized $ZrO_2$ fibers ($\sim 3\mu$ in diameter) had an extremely low bulk density, being in the range of 4 pounds per cubic foot or $\sim 1\%$ of theoretical density. However, the $ZrO_2$ fibers embrittled and powdered at 1100° C. (2012° F.), and due to their extremely large surface area per gram, began to sinter and shrink at 1200° C. (2192° F.). They sintered in a short time to a hard mass with high shrinkage at 1500° C. (2732° F.).

B. The extruded CaO-stabilized $ZrO_2$ rods were exposed to a temperature of 1400° C. (2552° F.) for a period of 3½ weeks, as a part of the thermal cycling tests, and the shrinkage rate and bulk density change as a function of time is shown in Table I, along with the initial sintering temperature of each rod. It can be seen from the data in Table I that only the low-fired (1200–1300° C.) rods will yield a volume shrinkage of the desired magnitude for accommodation of the expected amount of fuel swelling, which is of the order of 15% for a burnup of $20 \times 10^{20}$ fissions/cc. within the clad, assuming 0.7% $\Delta v./v.$ per $10^{20}$ fissions/cc.

C. The low-density $ZrO_2$ foams were also tested for isothermal shrinkage at 1400° C. and, as expected, no shrinkage occurred because the foams consisted of a farily dense matrix containing large pores approximately 25 mils in diameter.

D. The hollow stabilized $ZrO_2$ spheres, ranging in size from 10 to 33 mils, were heat treated for four weeks at 1400° C. (2552° F.) with no apparent shrinkage and with very slight interparticle sticking due to initiation of sintering at the points of contact. The hollow spheres were also heat treated in air at 1850° C. (3362° F.) for four hours and at 2350 C. (4262° F.) for 10 minutes with no apparent shrinkage. The extent of sintering at points of contact between particles was sufficient at both 1850° C. and 2350° C. to produce a foam-like structure with very low compressive strength ($<1000$ p.s.i.). However, the degree of sintering, even at 2350° C., was small enough so that the individual bubbles could still be separate from the "sinter cake" with relative ease, and with little damage to the individual bubbles. Although the $ZrO_2$ bubbles were tested to a maximum temperautre of 2350° C., they should be useful to the melting temperature of $ZrO_2$ stabilized with $\sim 10$ wt. percent CaO, generally given as 2550° C. (4622° F.). The vapor pressure of cubic stabilized $ZrO_2$ has been given as $4.5 \times 10^{-5}$ mm. Hg at 1925° C. (3500° F.), indicating sufficient stability against loss by vaporization.

II. Thermal cycling tests

The 0.160" diameter CaO-stabilized $ZrO_2$ foams and low-density extruded rods survived 40 complete cycles from 900° C. (1652° F.) to 1400° C. (2552° F.) and back with no mechanical or structural degradation in the 6-inch lengths tested. Upon completion of the 40 cycles, the same foam and extruded rod samples were plunged into cold (40° F.) water from 1400° C. with no adverse effects. The water-saturated foams and extruded rods were then thrust back into the furnace at 1400° C., and were again quenched and reheated. After completion of these quenching and re-heat-while-saturated tests, none of the 6-inch long sample appeared to have been damaged.

III. Compressive strength tests

The results of room-temperature compressive strength measurements on axially loaded CaO-stabilized $ZrO_2$ cylinders one-inch in diameter and one-inch high are given in Table II. It should be noted from Table II that the cylinders which are sintered at 1400° C. (2552° F.) to a bulk density of 62% of theoretical had a compressive strength of 12,000 p.s.i., or an order of magnitude greater than the maximum desired compressive strength. The compressive strength test was repeated in a hot press at 1000° C. (1832° F.) using samples sintered at 1400° C. The compressive strength decreased only 5 to 10% below that of the same material at room temperature, thus indicating that the low-density extruded rods will act as compressible shapes only if sintered at temperatures below 1400° C., and then only if the in-pile temperatures are also below 1400° C.

TABLE I.—ISOTHERMAL SINTERING DATA ON EXTRUDED $ZrO_2$ RODS

| Sintering Temperature (° C./hrs. in air) | Bulk Density (Percent of TD.) | After 340 Hours at 1,400° C. in Air | | After 580 Hours at 1,400° C. in Air | |
|---|---|---|---|---|---|
| | | Volume Shrinkage (Percent) | Bulk Density (Percent of TD.) | Volume Shrinkage (Percent) | Bulk Density (Percent of TD.) |
| 1,200/2 | 58.0 | 19.0 | 71.6 | 22.4 | 74.7 |
| 1,300/2 | 59.5 | 15.1 | 69.8 | 17.0 | 71.4 |
| 1,400/2 | 62.0 | 13.6 | 71.9 | 15.2 | 73.3 |
| 1,500/2 | 67.0 | 5.6 | 71.0 | 8.1 | 73.0 |
| 1,600/2 | 69.5 | 1.8 | 71.0 | 4.4 | 73.0 |
| 1,800/2 | 76.0 | 0 | 76.0 | 0 | 76.0 |

TABLE II.—COMPRESSIVE STRENGTH OF LOW-DENSITY CaO-STABILIZED $ZrO_2$

| Sintering Temperature (° C./2 hrs. in air) | Bulk Density (Percent of TD) | Compressive Strength | |
|---|---|---|---|
| | | (p.s.i.) | (Kg./cm.²) |
| 1,200 | 58.0 | 300 | 21 |
| 1,300 | 59.5 | 1,600 | 113 |
| 1,400 | 62.0 | 12,000 | 844 |
| 1,500 | 67.0 | 35,000 | 2,460 |
| 1,600 | 69.5 | 55,000 | 3,870 |
| 1,800 | 76.0 | 66,000 | 4,641 |

However, because the mandril will be loaded in-pile radially rather than axially, samples of the 0.160″ diameter foams and extruded rods were tested under isostatic loads of 1000, 5000, and 25,000 p.s.i., with the samples encased in thin-walled rubber tubes. The results of this test are given in Table III. These tests were conducted at room temperature. As seen in Table III, only the extruded rods sintered at 1200° C. and the foam with the lowest bulk density were weak enough to crumble under isostatic pressures of 1000 p.s.i. or less.

TABLE III.—RESULTS OF ROOM-TEMPERATURE ISOSTATIC COMPRESSIVE TESTS ON ZrO₂ FOAMS AND EXTRUDED RODS

| Sample | Bulk Density (Percent of TD) | Result of Test |
|---|---|---|
| Extruded rod, 1,200° C | 58.0 | Crumbled to powder at 1,000 p.s.i. |
| Extruded rod, 1,300° C | 59.5 | Crumbled to powder at 5,000 p.s.i. |
| Extruded rod, 1,400° C | 62.0 | Broken in chunks at 25,000 p.s.i. |
| Extruded rod, 1,500° C | 67.0 | Diameter unchanged at 25,000 p.s.i. |
| Extruded rod, 1,600° C | 69.5 | Do. |
| Extruded rod, 1,800° C | 76.0 | Do. |
| Zircoa foam Y-1411-1 | 43.5 | Broken into chunks at 5,000 p.s.i. |
| Zircoa foam Y-1411-2 | 34.6 | Crumbled to powder at 25,000 p.s.i. |
| Zircoa foam Y-1412 | 39.8 | Diameter unchanged at 25,000 p.s.i. |
| Zircoa foam Y-1413 | 36.7 | Crumbled to powder at 5,000 p.s.i. |
| Zircoa foam Y-1480 | 22.5 | Crumbled to powder at 1,000 p.s.i. |

The hollow stabilized $ZrO_2$ spheres were evaluated for compressive strength under both isostatic loading while confined in lead tubing and axial loading while confined in a double acting steel die. The lead tubing was made by shaping 0.008″ thick lead foil into tubes and butt soldering the joint. The tubing then had an O.D. of 0.175″ and an I.D. of 0.159″. The bubble samples, which were axially loaded in a ½″ diameter steel die, filled the die to a height less than one inch, so that $l/d$ ratio was less than two. Plots of percent volume decrease versus applied pressure are shown in FIG. 9 for −20 +30 mesh (33 to 23 mils), −30 +42 mesh (23 to 14 mils), and −42 +60 mesh (14 to 10 mils), stabilized $ZrO_2$ bubbles.

It should be noted from FIG. 9 that in all cases there appeared to be an initial resistance to pressure of a few hundred p.s.i., before the bubbles began to break and decrease in bulk volume. This resistance pressure was higher for the smaller sized bubbles than for the larger sizes. Also, the larger sizes showed a greater bulk volume decrease than the smaller sizes at equivalent pressures. However, the maximum possible bulk volume decrease is inversely proportional to the initial bulk density of each particle size fraction, with the larger bubbles being less dense in bulk (or not as closely packed) than the smaller bubbles. The bulk density of the −20 +30 mesh, −30 +42 mesh, and −42 +60 mesh fractions of the $ZrO_2$ bubbles was 27%, 30%, and 32% of theoretical density, respectively.

The isostatic compression of bubbles in the lead tubing was more difficult to evaluate because the soldered seam created an area of greater strength than in the bulk of the tubing, and it is uncertain how much of the applied pressure was used in deforming the tubing. The tubing, after compressing, conformed to the outline of the bubble surfaces around which it bent, and this corrugation of the lead tubing also would increase its strength, adding to the uncertainty in the value of the applied pressure. At any rate, the volume of $ZrO_2$ bubbles inside the tubing decreased by 12.1% and 22.5% respectively for applied pressures of 1000 and 5000 p.s.i. The bubbles used in this test were −20 +30 mesh.

IV. *Water corrosion tests*

Water corrosion tests at 680° F. in high pH (9 to 10) ammoniated water were run on low-density extruded rods, low-density foams, and hollow spheres, all of CaO-stabilized $ZrO_2$, for a period of nine days.

The results of this test indicate that low-fired extruded rods and low-density foams are not resistant to corrosion by water under the test conditions, and it is probable that a mandril of these materials would be quickly leached out or rendered into powder in a leaking fuel element.

However, the hollow spheres are the most resistant, being virtually unattacked after nine days. The resistance of this material to water corrosion is largely due to the fact that the hollow spheres (bubbles) are produced by blowing air through a stream of arc-melted CaO-stabilized $ZrO_2$. Thus, the central void in the bubble is surrounded by a dense (~99% of TD) shell which resists corrosion by water.

V. *Mechanical relocation*

Preliminary experiments were conducted using glass tubing whose inside diameters were 158 mils and 236 mils and which were packed with hollow $ZrO_2$ spheres in the size range of 23 mils to 33 mils. Powder composed of crushed hollow spheres which passed through a 100 mesh sieve was then placed in the glass tubes on top of the spheres. The tubes were then vibrated using a "BV1 Vibro-Graver" which was set at various frequencies. After one hour the powder had migrated about one to two inches through the spheres. There was no further change in the next 24 hours or by varying the frequency of the Vibro-Graver. Although this test was purely qualitative, it did serve to indicate suitability of the mandril for the purpose intended.

As a result of these tests we conclude that use of a mechanically compressible mandril centrally located in the void in an annular pellet fuel element is feasible. While the above tests were restricted to demonstration of the utility of calcia-stabilized, cubic-phase zirconia, other materials such as those mentioned heretofore could also be used. In addition, a mandril of thoria bubbles could be used if it develops that production of thoria bubbles is practical and such a mandril material would serve a useful function as breeding material rather than being inert.

It is apparent from the described tests that hollow spheres, or bubbles, best satisfy the requirements for potential mandril materials. That is, they will prevent relocation of cracked and spalled ceramic fuel into the central void of an annular pellet fuel element, while providing sufficient free volume for accommodation of fuel swelling. This free volume becomes available as the bubbles are crushed by the inward swelling fuel at pressures of 1000 p.s.i. or less, depending on bubble size, and can easily amount to 18% of the initial mandril volume. Slightly higher pressures, but still less than 2000 p.s.i., can make nearly 30% of the initial mandril volume available for swelling.

The other mandril materials described—foams, fibers, and low-density sinterable rods—are also suitable under specialized conditions of operation. For example, low-density, sinterable rods and foams can be used where a small amount of in-pile mandril shrinkage is desirable for accommodation of fuel swelling, but where the low-density mandril will not be exposed to superheated water. Also stabilized zirconia fibers can be used provided the temperature does not exceed about 1200° C.

It will be understood that the invention is not to be

What is claimed is:

1. A fuel element for a nuclear reactor comprising an annular core consisting of a ceramic fissionable material having a central opening therein, metallic cladding surrounding the core, and a mechanically compressible mandril disposed within the central opening to prevent dislocated fragments of fuel from falling into the central opening while permitting the fuel to swell inwardly.

2. A fuel element according to claim 1 wherein the mandril takes the form of a plurality of refractory hollow spheres of varying sizes.

3. A fuel element according to claim 2 wherein the refractory material is calcia-stabilized zirconia and the ceramic fissionable material is $U^{235}O_2$.

4. A fuel element according to claim 1 wherein the mandril comprises a rope formed of refractory ceramic fibers.

5. A fuel element according to claim 1 wherein the mandril is composed of a zirconia foam.

6. A fuel element according to claim 1 wherein the mandril comprises one or more low-density, low-strength extruded rods of calcia-based zirconia.

References Cited by the Examiner

UNITED STATES PATENTS

| | | | |
|---|---|---|---|
| 2,852,460 | 9/1958 | Abbott et al. | 176—68 |
| 3,114,693 | 12/1963 | Furgerson | 176—83 X |
| 3,179,572 | 4/1965 | Perilbon | 176—83 X |

BENJAMIN R. PADGETT, *Primary Examiner.*

M. J. SCOLNICK, *Assistant Examiner.*